United States Patent [19]
Miesterfeld et al.

[11] Patent Number: 5,666,810
[45] Date of Patent: Sep. 16, 1997

[54] ELECTRO-THERMAL ACTUATOR SYSTEM

[75] Inventors: Frederick O. R. Miesterfeld, Troy; Timothy A. Flickinger, Rochester Hills, both of Mich.

[73] Assignee: Chrysler Corporation, Auburn Hills, Mich.

[21] Appl. No.: 353,864

[22] Filed: Dec. 12, 1994

[51] Int. Cl.[6] ................................................. F03C 5/00
[52] U.S. Cl. ........................ 60/530; 60/528; 60/531
[58] Field of Search .......................... 60/516, 528, 530, 60/531; 318/560, 599; 327/175; 388/819; 307/117; 219/490, 492, 494, 497, 488

[56] References Cited

U.S. PATENT DOCUMENTS

| | | | |
|---|---|---|---|
| 3,131,273 | 4/1964 | Blodgett | 337/118 |
| 3,902,150 | 8/1975 | Wada et al. | 337/116 |
| 4,002,882 | 1/1977 | McCutchen | 219/499 |
| 4,029,941 | 6/1977 | Huebscher et al. | 219/511 |
| 4,081,963 | 4/1978 | Stove | 60/528 |
| 4,104,507 | 8/1978 | Tisone et al. | 219/513 |
| 4,318,529 | 3/1982 | Huelle et al. | 60/531 |
| 4,611,562 | 9/1986 | Nakano et al. | 123/440 |
| 4,759,189 | 7/1988 | Stropkay et al. | 60/531 |
| 4,796,207 | 1/1989 | Andre et al. | 364/557 |
| 4,887,429 | 12/1989 | Birli, Sr. et al. | 60/527 |
| 5,057,667 | 10/1991 | Bell et al. | 392/458 |
| 5,309,077 | 5/1994 | Choi | 388/819 |

*Primary Examiner*—Ira S. Lazarus
*Assistant Examiner*—Alfred Basichas
*Attorney, Agent, or Firm*—Roland A. Fuller, III

[57] ABSTRACT

An electro-thermal actuator has linear displacement of its actuator rod accurately controlled and monitored. The actuator includes a sealed chamber containing an expansible and contractible working fluid. The working fluid is heated by way of pulse width modulated current applied to a heater in thermal contact with the fluid. As heat is applied to the working fluid, it undergoes a phase change to a gas. The resulting gas increases the pressure within the chamber, thereby exerting force on a piston and linearly displacing an actuator rod attached to the piston against the bias of a spring. The actuator includes a temperature sensor mounted within the chamber and in thermal contact with the working fluid to thereby monitor the temperature of the working fluid. The working fluid temperature is provided as an input to a feedback circuit which controls the width of the current pulses applied to the heater used to heat the working fluid. In this way, the temperature of the working fluid may be monitored and controlled, thereby allowing accurate control over the linear displacement of the moveable piston rod portion of the actuator.

4 Claims, 5 Drawing Sheets

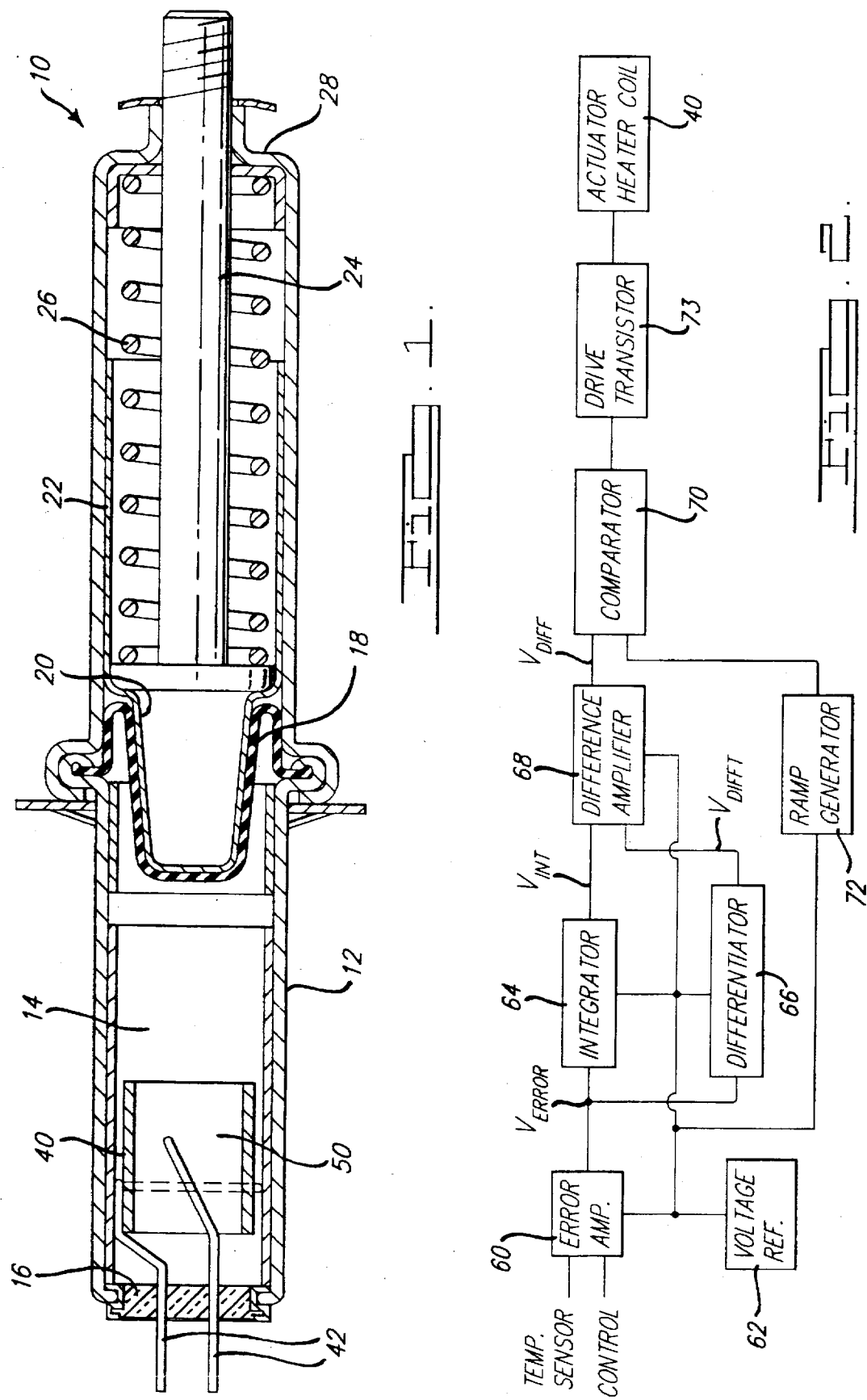

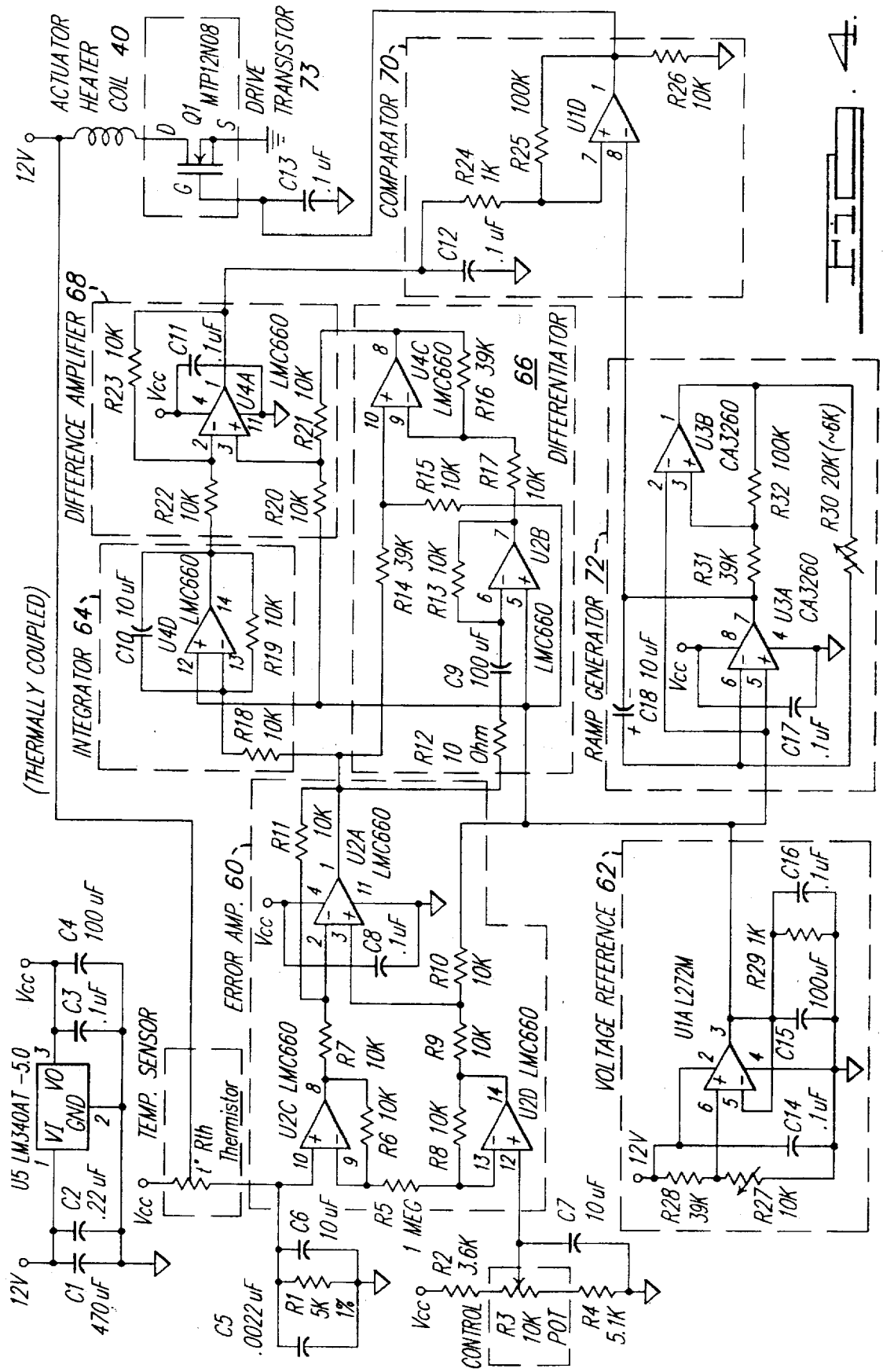

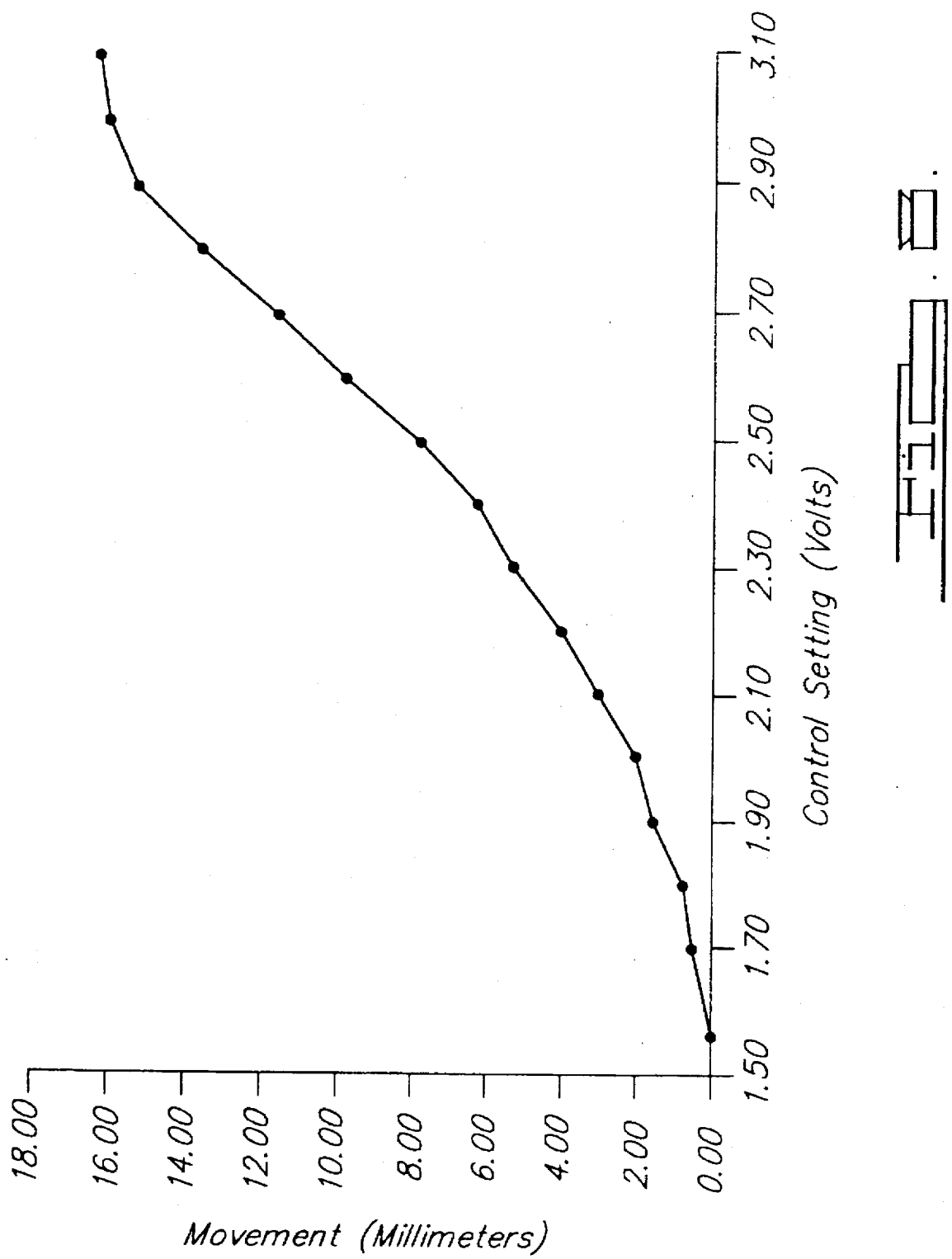

ELECTRO-THERMAL ACTUATOR SYSTEM

FIELD OF THE INVENTION

The present invention generally relates to the field of mechanical actuators, and more specifically, to a system for causing an electro-thermal actuator to provide precise, controlled linear movement.

BACKGROUND OF THE INVENTION

Mechanical actuators are typically used to provide controlled, precise linear movement. One form of mechanical actuator is the electro-thermal actuator which can provide precise movement over one or two inches. This type of actuator has a working or internal medium in a sealed variable volume chamber in which one movable wall of the chamber, which is to execute the precise movement, can be acted upon by the medium. By means of changes created in the medium temperature, pressure increases and decreases, respectively, are applied to the movable wall as a result of controlled expansion and contraction of the medium. The changes in chamber volume are converted to a linear or mechanical output to perform work on an external device.

In an electro-thermal actuator, the working medium may be a fluid. Changes in the fluid pressure in the chamber are effected by applying energy to the working fluid, which energy may be in the form of thermal energy, such as heat. The application of heat causes the fluid to undergo a phase change from liquid to gas. Application of heat is typically effected using a resistance-type heater placed within the fluid chamber. Application of electrical current to the resistive element of the heater causes the element to heat up, thereby imparting heat to the working fluid in proximity to the heater.

Electro-thermal actuators which utilize thermal energy to expand an expansible working medium are known. One such type of actuator is disclosed in U.S. Pat. No. 4,029,041 to Huebscher et al. This reference discloses an expanding liquid thermal actuator. In this actuator, a heater is energized in order to heat and thereby expand the volume of a working fluid. The increased pressure of the working fluid acts to move a piston. Accurate control of the heating mechanism and the resulting piston movement, however, is not disclosed. U.S. Pat. No. 4,887,429 to Birli, Sr. et al. describes an electro-thermal actuator having a flexible separator partitioned between a fluid chamber and a heater chamber. The separator is flexible in order to allow it to withstand vibrations. Here also, there is no precise piston control.

U.S. Pat. No. 4,759,189 to Stropkay et al. discloses an electro-thermal actuator which utilizes a positive temperature coefficient (PTC) heater in series with a conventional resistance heater. The conventional heater provides a fast initial response, while the PTC heater subsequently acts as a current limiting device to control the amount of current being applied to the heater. The PTC heater is also used to somewhat regulate the temperature of the working fluid, since the temperature of the PTC is limited to its "anomaly temperature" or the temperature at which the transition from low resistance to extremely high resistance occurs. U.S. Pat. No. 4,104,507 to Tisone et al. describes an electro-thermal actuator with a PTC heater. However, in neither of these patents is there a provision for selectively controlling temperature to thereby control the extent of movement of the actuator.

SUMMARY OF THE INVENTION

It is an object of the present invention to provide an electro-thermal actuator having highly precise and controllable linear displacement characteristics.

It is a further object of the present invention to provide an electro-thermal actuator employing a temperature sensor-based feedback circuit for controlling the linear displacement of the actuator.

In accordance with an illustrative embodiment of the present invention, there is provided an electro-thermal actuator whose linear displacement can be accurately controlled and monitored. The actuator includes a chamber which is sealed. A piston is movably mounted in one wall so the chamber has a variable volume. The chamber contains an expansible and contractible working fluid. As the working fluid is heated by way of a heater in thermal contact with the fluid, the working fluid undergoes a phase change to a gas. The resulting gas increases the pressure within the chamber, thereby exerting force on the piston and linearly displacing the piston and the piston rod attached to the piston. The actuator includes a temperature sensor mounted within the chamber and in thermal contact with the working fluid to thereby monitor the temperature of the working fluid. The working fluid temperature is provided as an input to a feedback circuit which controls the heater used to heat the working fluid. In this way, the temperature of the working fluid may be monitored and controlled, so as to allow accurate control over the linear displacement of the moveable piston rod portion of the actuator. A spring may be used to resist the movement of the piston and to aid in constriction of the volume of the working fluid when the temperature is lowered.

BRIEF DESCRIPTION OF THE DRAWINGS

The foregoing and other features of the present invention will be more readily apparent from the following detailed description of the preferred embodiments taken in conjunction with the attached drawings, wherein:

FIG. 1 is a cross-sectional view of an electro-thermal actuator according to the present invention;

FIG. 2 is a block diagram of the electro-thermal actuator control circuit according to the present invention;

FIG. 4 is a circuit schematic of the block diagram of FIG. 2;

FIG. 5b is a graphical illustration of the electrical current-time waveform used to produce the movement of the prior art actuator shown in FIG. 5a;

FIG. 6b is a graphical illustration of the electrical current-time waveform used to produce the movement of the present electro-thermal actuator shown in FIG. 6a;

FIG. 7b is a graphical illustration of the electrical current-time waveform used to produce the movement of the present electro-thermal actuator shown in FIG. 7a; and FIG. 8 is a graphical illustration of the actuator movement as a function of a control signal.

DETAILED DESCRIPTION OF AN ILLUSTRATIVE EMBODIMENT

Figure 3:
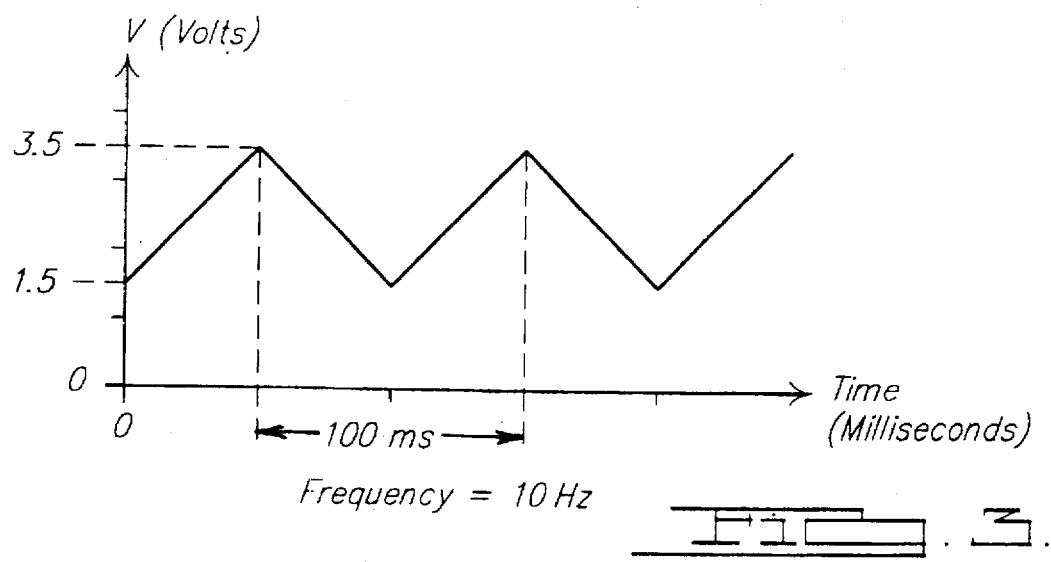
FIG. 3 is an illustration of a waveform output of a ramp generator.

FIG. 1 illustrates an electro-thermal actuator 10 according to the present invention. The actuator 10 includes a sealed chamber 12 containing working fluid 14. The chamber 12 is sealed at one end with a glass seal 16 and at the other end with a moveable rolling diaphragm 18. The rolling diaphragm 18 separates the chamber 12 from piston 20 which is located in the forward portion of actuator 10. Piston 20 is adapted to move axially within piston guide 22, which may be a generally cylindrical tubular structure within the forward portion of the actuator 10. Axially attached to the piston 20 is piston rod 24 which extends outside the actuator 10.

Piston 20 is biased in the direction of the chamber 12 by way of spring 26, one end of which abuts against the forward end 28 of the actuator 10 and the other end of which urges piston 20 into contact with rolling diaphragm 18.

Chamber 12 includes a heater 40 for heating the working fluid 14. The heater 40, which may be a resistance-type heater, is heated by way of electrical current provided over contacts 42. During operation of the actuator, heat is applied to working fluid 14 as heater 40 is heated by electrical current. As the temperature of working fluid 14 increases, it undergoes a phase change and is transformed to a gas. The volume of resulting gas is greater than that previously occupied by working fluid 14, the result being that rolling diaphragm 18 is pushed toward the forward end 28 of the actuator 10. This pressure, which is applied by the gas to the diaphragm 18, pushes piston 20 and the connected piston rod 24 against the force of the spring 26, thereby causing the piston rod 24 to extend a predetermined distance beyond the end 28 of the actuator 10.

Since spring 26 offers more resistance as it is compressed, i.e., as the piston rod 24 extends, the amount of the extension of the piston rod 24 is determined by the amount of pressure which needs to be applied on diaphragm 18 by the gasified working fluid 14 to balance the spring force at that particular extension of the piston rod. The pressure of the gasified working fluid 14 is controlled by the temperature to which the working fluid 14 is heated. Thus, in order to accurately control the extension of piston rod 24, the temperature of the working fluid 14 must be monitored and controlled. This is achieved through the use of a temperature sensor 50 which is mounted adjacent heater 40 and in thermal contact with the working fluid 14 in the chamber 12. Temperature sensor 50, which may be in the form of a thermistor, provides a signal indicative of the temperature within chamber 12, i.e., the temperature of working fluid 14.

Monitoring and control of the temperature of the working fluid 14 will now be described with reference to the block diagram of FIG. 2. The temperature signal from temperature sensor 50 is applied as an input to error amplifier 60. The other input to error amplifier 60 is a user-settable control signal which determines the desired position or extension of the piston rod 24. The output of error amplifier 60 is essentially the amplified difference between the temperature sensor signal indicating the temperature of working fluid 14 and the user-settable control signal indicating the desired actuator extension. The user-settable control signal may be provided by way of a potentiometer (not shown) or other similar variable signal indicating device. Voltage reference 62 provides a reference voltage which is used by various circuit elements shown in FIG. 2. The output of voltage reference 62 is a non-zero voltage signal which is less than the full scale power supply voltage, such that the output of the various circuit elements may go positive with respect to the voltage reference, as well as negative.

The error signal output $V_{ERROR}$ from error amplifier 60 is integrated by integrator 64 to produce $V_{INT}$ according to the following relationship:

$$V_{INT} = -10 \int V_{ERROR} dt$$

$V_{INT}$ is an inverted integral of the error signal $V_{ERROR}$. The function of the integrator 64 to eliminate any steady state error that may be present in the control circuit of FIG. 2. The error signal $V_{ERROR}$ is also input to the Differentiator 66 which produces at its output $V_{DIFFT}$, which is the sum of the differentiated error signal and the error signal. The function of the Differentiator 66 is to reduce the response time of the overall system, without increasing the overshoot of the actuator. $V_{DIFFT}$ is produced according to the following relationship:

$$V_{DIFFT} = (3.9)(d V_{ERROR}/dt) + V_{ERROR}$$

The differentiator signal $V_{DIFFT}$ and the integrator signal $V_{INT}$ are both provided to a difference amplifier 68 whose output $V_{DIFF}$ is the difference between these two input signals. The difference amplifier signal $V_{DIFF}$ is applied to one input of a comparator 70 where it is compared with a fixed frequency, triangular amplitude wave produced by ramp generator 72, which is shown in FIG. 3. When the difference amplifier $V_{DIFF}$ is applied to the noninverting input of the comparator and the triangle wave is applied to the inverting input, the output of comparator 70 will be high as long as the amplitude of $V_{DIFF}$ is greater than the amplitude of the triangle wave. Once the amplitude of the triangle wave exceeds the amplitude of $V_{DIFF}$, the output of the comparator will go low. The period of time during which the output of the comparator is high is thus a function of the amplitude of $V_{DIFF}$. The greater the amplitude of $V_{DIFF}$, the greater the width of the high output of comparator 70. The output of comparator 70 is accordingly a pulse width modulated (PWM) signal which is applied to drive transistor 72 which in turn generates the electrical current signal applied to heater 40. The circuit implementation of the control circuit block diagram of FIG. 2 is illustrated in detail in FIG. 4. Appropriate blocks have been indicated on the circuit of FIG. 2 in order to identify the corresponding circuit implementation of each of the blocks of FIG. 2. The circuit implementation illustrated in FIG. 4 is accomplished using standard circuit components which are readily known to those of ordinary skill in the art, and accordingly, will not be discussed in detail herein.

By constantly monitoring the working fluid temperature by way of temperature sensor 50, and comparing this with the desired actuator movement, the control circuit can apply the appropriate drive transistor electrical current to thereby heat the working fluid 14 to the precise target temperature resulting in the desired actuator displacement. The desired actuator displacement is determined based on the user-settable control signal. The control signal is converted to a target temperature which must be maintained in order to achieve the desired extension of the actuator. This is accomplished by characterizing the extension-temperature characteristics of the actuator, i.e., how much extension is achieved at each different temperature.

Figure 5A:
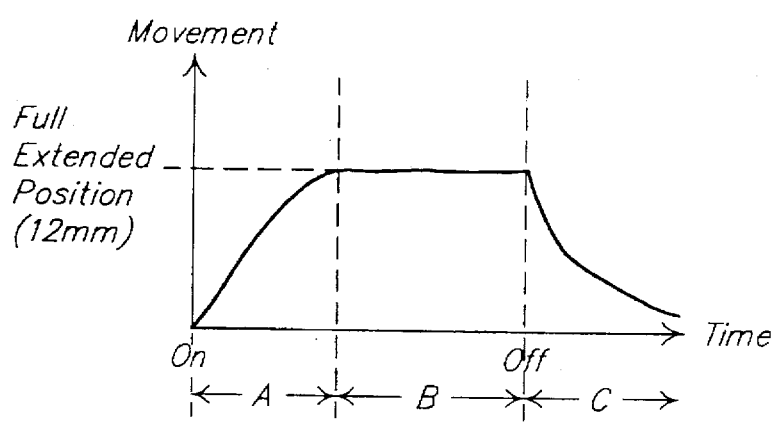
FIG. 5a is a graphical illustration of the movement of a prior art actuator.
Figure 5B:
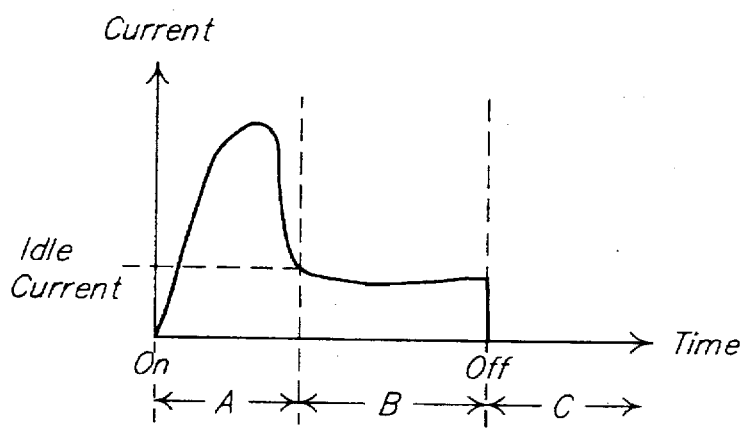

The electrical current drive signals and resulting actuator extension will now be described with reference to FIGS. 5a, 5b, 6a, 6b, 7a and 7b. First, FIG. 5b shows a typical electrical current drive waveform used in prior art actuators. The waveform is a continuous current waveform which increases rapidly to its peak value and then decreases to a non-zero idle current level which then drops off to zero current. The corresponding mechanical extension of the actuator is shown in FIG. 5a. As the drive current increases (region A), the actuator extension increases until it reaches maximum extension because the large current rapidly heats the working fluid to quickly produce a gas that applies pressure to the actuator piston. The current waveform then drops to an idle current level (region B) which maintains the temperature of the gas and keeps the actuator fully extended at a fixed, unchanging extension. Finally, the current waveform drops to zero (region C) at which time the gas cools and the actuator begins to retract.

Figure 6A:
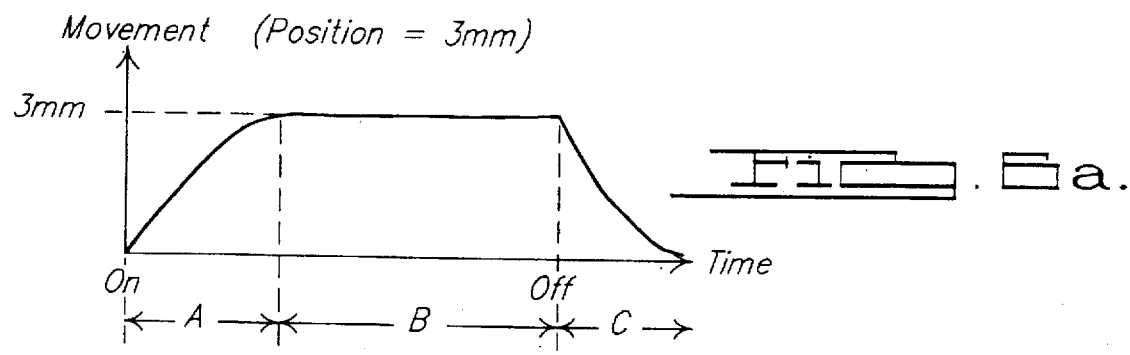
FIG. 6a is a graphical illustration of the movement of the electro-thermal actuator of the present invention.
Figure 6B:
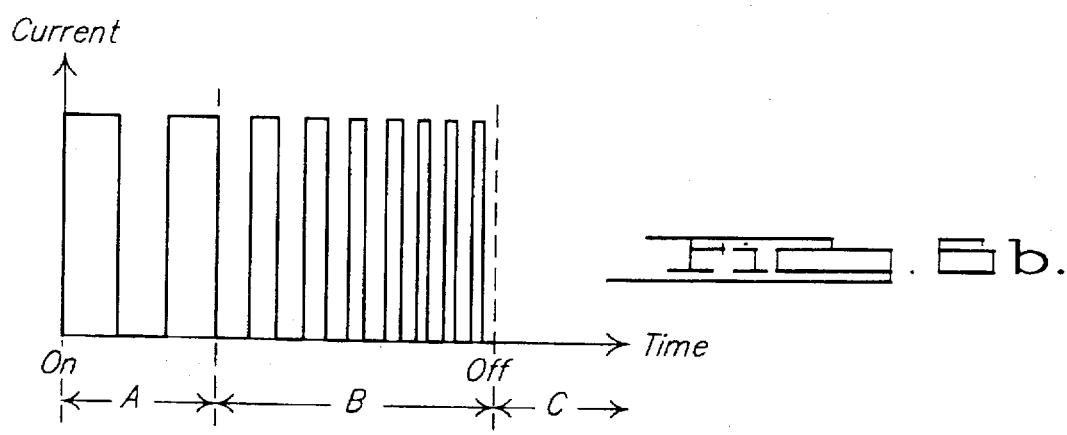
Figure 7A:
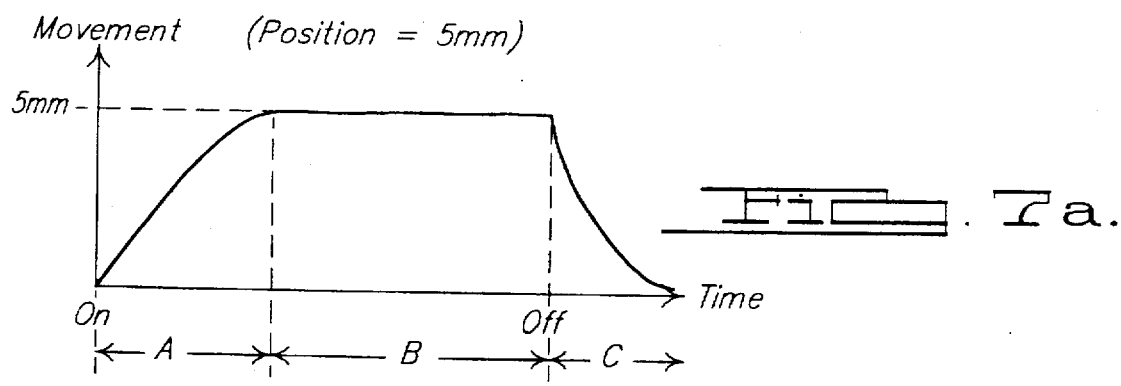
FIG. 7a is a graphical illustration of the movement of the electro-thermal actuator of the present invention.
Figure 7B:
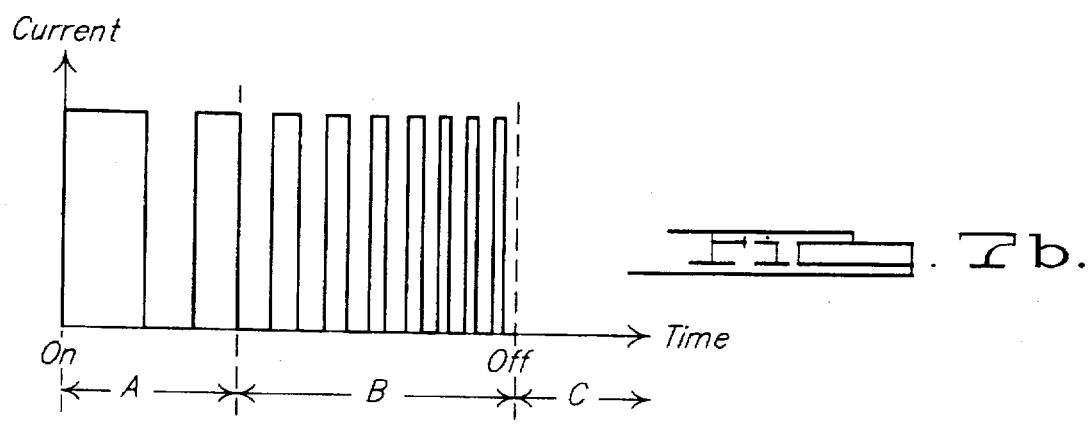

In the actuator of the present invention, an exemplary drive current waveform and resulting actuator extension are shown in FIGS. 6b and 6a, respectively. As shown in FIG. 6b, the electrical current drive waveform is a PWM signal having varying width pulses. Initially, the pulses are relatively wide (region A) in order to heat the working fluid in to a gas and extend the actuator. Once the actuator has been extended to the desired extension, the pulses become relatively narrow (region B), since all that is required is to maintain the temperature of the gas and keep the actuator in its extended state. Finally, when the pulses are turned off (region C), the gas cools and the actuator retracts. The specific widths of the region A pulses and the region B pulses are used to control the amount of extension of the actuator. For example, the pulses of FIG. 6b which have a width of approximately 2.5 milliseconds result in a 3 millimeter(mm) actuator extension, as shown in FIG. 6a. Similarly, larger width pulses (FIG. 7b), having a width of approximately 3.0 milliseconds result in a larger actuator extension of 5 mm (FIG. 7a). In this way, the actuator may be extended to any desired extension by controlling the pulse width of the PWM electrical current drive waveform.

FIG. 8 illustrates the actuator movement as a function of the user-settable control signal. In FIG. 8, the user-settable control signal is specified as a voltage signal, which may be achieved using, for example, a potentiometer to convert the user-settable control signal into a corresponding voltage signal. The resulting actuator movement is indicated in millimeters. As can be seen in FIG. 8, the actuator of the present invention is a substantially linear device across a wide input signal range, i.e., in the range of approximately 2–3 volts, the actuator movement is a linear function of the user-settable control signal.

Actuators according to the present invention are accurate and easy to use. They can be particularly effective where the actuator rod is used to control the position of a blend-air door in a climate control device, such as that in the heating and air conditioning unit of a motor vehicle.

While the invention has been particularly shown and described with reference to a preferred embodiment thereof, it will be understood by those skilled in the art that various changes in form and details may be made therein without departing from the spirit and scope of the invention.

What is claimed is:

1. An electro-thermal actuator, comprising:

a housing containing a sealed fluid chamber with a moveable portion and a biasing device which biases the movable portion in a direction to reduce the volume of the chamber, said fluid chamber including a working fluid, a heater for heating the working fluid, and a temperature sensor that senses the temperature of the working fluid and produces a sensor signal related thereto, an actuator rod connected to the movable portion, said actuator rod extending beyond the housing and being moved by the movable portion against the bias of the biasing device a distance related to the distance moved by the movable portion, and a heater control circuit which controls the heating of said working fluid by said heater such that the volume of the fluid expands and contracts depending on its temperature, said circuit causing the moveable portion to move a predetermined distance, said circuit including a comparator which compares a signal related to a desired movement of the actuator rod and a signal received from the sensor and producing pulses of current to the heater which have a width related to the comparison.

2. The electro-thermal actuator of claim 1, wherein the heater control circuit comprises a signal setting device which generates a signal related to a desired movement of the actuator rod.

3. The electro-thermal actuator of claim 1, wherein said movable portion is a flexible diaphragm and said biasing device is a coil spring.

4. The electro-thermal actuator of claim 3, wherein the diaphragm is a rolling diaphragm.

* * * * *